(12) United States Patent
Price et al.

(10) Patent No.: US 10,486,051 B2
(45) Date of Patent: Nov. 26, 2019

(54) BACKPACK FOR A PERSONAL TRANSPORT VEHICLE

(71) Applicant: Boosted, Inc., Mountain View, CA (US)

(72) Inventors: Levi Jacob Price, Sunnyvale, CA (US); Jukka Rautiainen, Cupertino, CA (US); John Ulmen, Emerald Hills, CA (US)

(73) Assignee: Boosted, Inc., Mountain View, CA (US)

( * ) Notice: Subject to any disclaimer, the term of this patent is extended or adjusted under 35 U.S.C. 154(b) by 0 days.

(21) Appl. No.: 15/877,201

(22) Filed: Jan. 22, 2018

(65) Prior Publication Data

US 2019/0090616 A1  Mar. 28, 2019

Related U.S. Application Data

(60) Provisional application No. 62/563,551, filed on Sep. 26, 2017.

(51) Int. Cl.
*A45F 3/04* (2006.01)
*A63C 17/01* (2006.01)
(Continued)

(52) U.S. Cl.
CPC ........ *A63C 17/017* (2013.01); *A63C 17/0006* (2013.01); *A63C 17/01* (2013.01); *A63C 17/012* (2013.01); *A63C 17/015* (2013.01); *A63C 17/12* (2013.01); *A63C 17/26* (2013.01); *A63C 19/065* (2013.01); *B60L 50/66* (2019.02); *B60L 58/20* (2019.02); *H01M 2/1083* (2013.01); *A45F 3/04* (2013.01); *A63C 2019/067* (2013.01); *A63C 2203/12* (2013.01); *A63C 2203/14* (2013.01);
(Continued)

(58) Field of Classification Search
CPC ........ A45F 3/04; A45F 3/08; A45F 2003/003; A45F 2200/05; A63C 17/0006; A63C 17/0013; A63C 17/002; A45C 13/002; A45C 13/38
See application file for complete search history.

(56) References Cited

U.S. PATENT DOCUMENTS 5,016,794 A * 5/1991 Beagle, Jr. ............... A45F 3/14
211/60.1
5,092,506 A * 3/1992 Bolduc ..................... A45F 3/04
224/191

(Continued)

*Primary Examiner* — Corey N Skurdal
(74) *Attorney, Agent, or Firm* — Rutan & Tucker, LLP

(57) ABSTRACT

A backpack is disclosed for a personal transport vehicle including, in some embodiments, a back piece including a molded front panel, a securing device, a padded back panel, and a shoulder strap system. The molded front panel includes at least two ridges configured for placement of at least a portion of a body of the personal transport vehicle between the ridges. The securing device, which is attached to a first ridge of the ridges, is configured to cross over the molded front panel to a second ridge of the ridges to secure the body of the personal transport vehicle between the ridges when present. The padded back panel is configured to rest against a backpack wearer's back. The shoulder strap system includes a pair of shoulder straps extending from a top portion of the back piece, across the back panel, and to a medial portion of the back panel.

17 Claims, 13 Drawing Sheets

Figure 1A:
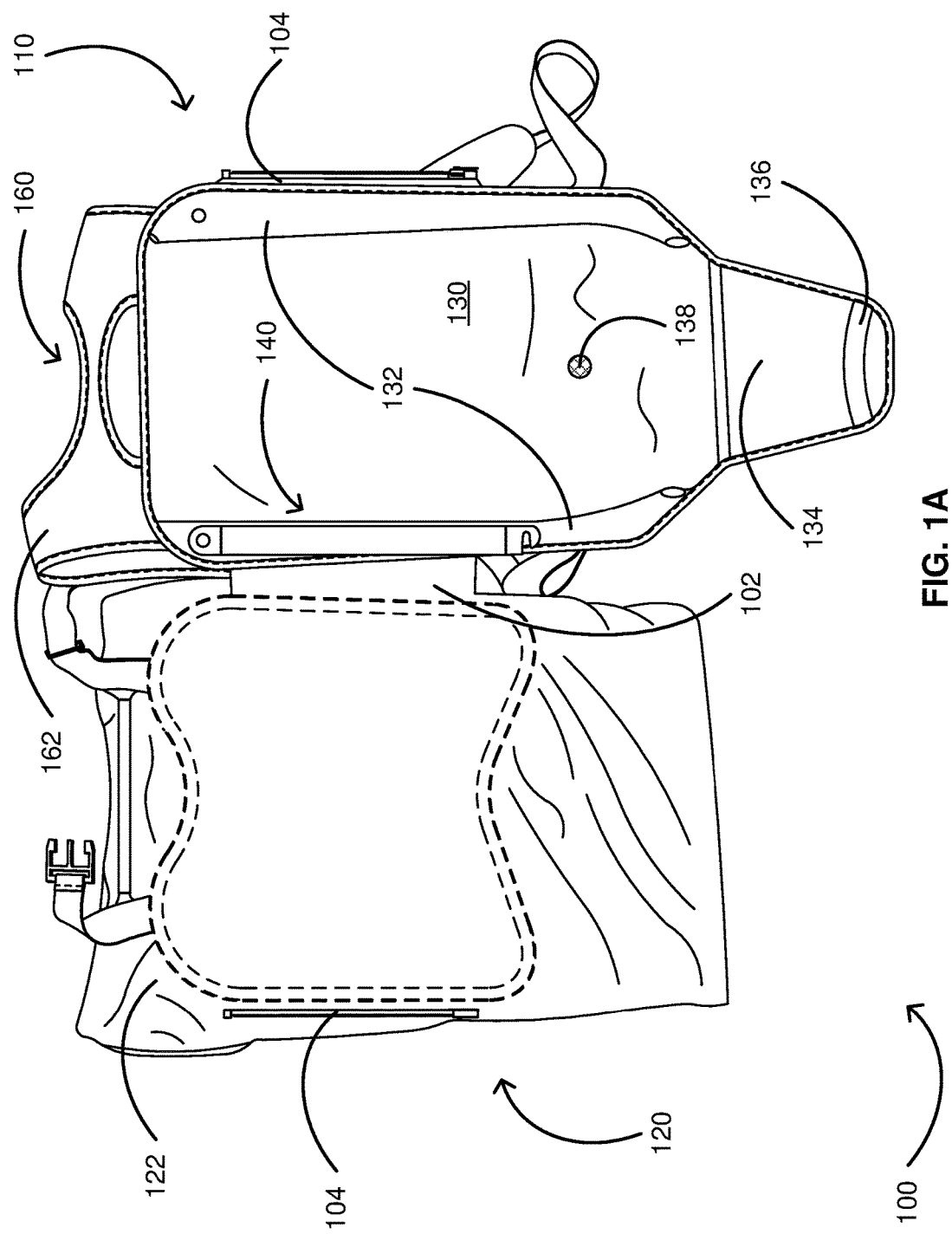

(51) Int. Cl.
*A63C 17/12* (2006.01)
*B60L 58/20* (2019.01)
*B60L 50/60* (2019.01)
*H01M 2/10* (2006.01)
*A63C 17/00* (2006.01)
*A63C 17/26* (2006.01)
*A63C 19/06* (2006.01)
*B32B 17/06* (2006.01)
*B32B 5/24* (2006.01)

(52) U.S. Cl.
CPC ...... *A63C 2203/22* (2013.01); *A63C 2203/24* (2013.01); *A63C 2203/42* (2013.01); *B32B 5/245* (2013.01); *B32B 17/062* (2013.01); *B32B 17/064* (2013.01); *B32B 17/066* (2013.01); *H01M 2220/20* (2013.01)

(56) References Cited

U.S. PATENT DOCUMENTS

| | | | | |
|---|---|---|---|---|
| 9,089,199 | B1* | 7/2015 | Taylor | A45C 13/02 |
| 2003/0071429 | A1* | 4/2003 | Bradshaw | A63C 17/01 |
| | | | | 280/87.041 |
| 2003/0127483 | A1* | 7/2003 | Black | A43B 5/0425 |
| | | | | 224/628 |
| 2004/0238585 | A1* | 12/2004 | Scarano | A45F 3/02 |
| | | | | 224/613 |
| 2005/0218171 | A1* | 10/2005 | Bellerive | A45C 5/143 |
| | | | | 224/576 |
| 2012/0286011 | A1* | 11/2012 | Wegener | A45C 13/02 |
| | | | | 224/627 |
| 2013/0081891 | A1* | 4/2013 | Ulmen | A63C 17/12 |
| | | | | 180/181 |
| 2017/0251791 | A1* | 9/2017 | Ball | A45F 3/04 |
| 2018/0087819 | A1* | 3/2018 | Triska | A45C 13/008 |

* cited by examiner

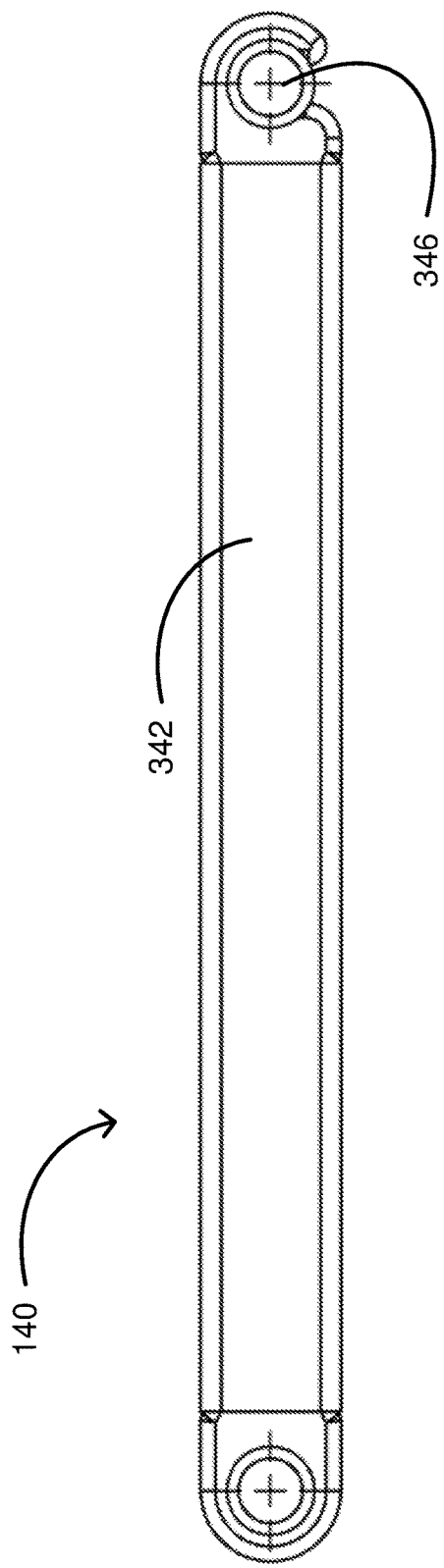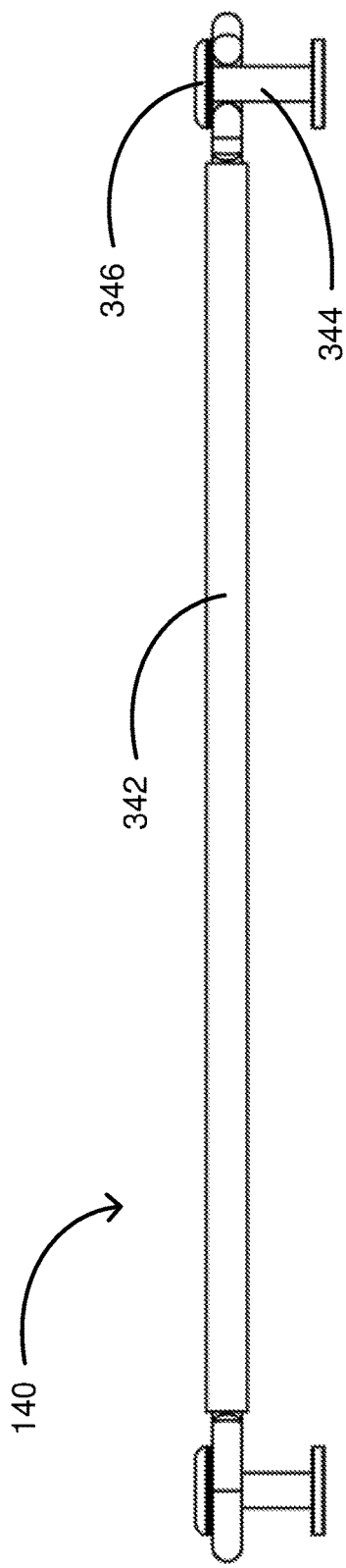
FIG. 3A
FIG. 3B

500C

```
Form a bag of the front piece including a main storage compartment from a
flexible material
                                                                        542
```

```
Install a magnetic pocket with a magnetic clasp in a first side of the bag
                                                                        544
```

```
Install a zippered pocket in a second side of the bag
                                                                        546
```

FIG. 5C

BACKPACK FOR A PERSONAL TRANSPORT VEHICLE

CROSS REFERENCE

This application claims the benefit under 35 USC 119 of U.S. Provisional Patent Application No. 62/563,551, filed Sep. 26, 2017, titled "Electric personal transport vehicle with various improvements," which is hereby incorporated herein by reference in its entirety.

NOTICE OF COPYRIGHT

A portion of this disclosure contains material that is subject to copyright protection. The copyright owner has no objection to the facsimile reproduction by anyone of the material subject to copyright protection as it appears in the United States Patent & Trademark Office's patent file or records, but otherwise reserves all copyright rights whatsoever.

FIELD

Embodiments of the design provided herein generally relate to a backpack for a personal transport vehicle such as an electric-powered skateboard.

BACKGROUND

Personal transport vehicles are a popular means of transport. Because smaller-sized personal transport vehicles lack a speed and range of larger-sized personal transport vehicles such as gasoline-powered motor vehicles, electrically powered versions of such smaller-sized personal transport vehicles are being developed, especially to bridge the so-called last-mile transportation gap. Before or after the last-mile transportation gap is bridged, however, users of the smaller-sized personal transport vehicles such as electrically powered skateboards need a convenient place to securely store their vehicles. Provided herein is a backpack for a personal transport vehicle and methods thereof that meet or exceed at least the foregoing need.

SUMMARY

Provided herein is backpack for a personal transport vehicle including, in some embodiments, a back piece including a molded front panel, a securing device attached to the molded front panel, a padded back panel opposite the molded front panel, and a shoulder strap system of the backpack. The molded front panel includes at least two ridges configured for placement of at least a portion of a body of the personal transport vehicle between the ridges. The securing device is fixedly attached to a first ridge of the ridges. The securing device is configured to cross over the molded front panel to a second ridge of the ridges to secure the body of the personal transport vehicle between the ridges when the personal transport vehicle is placed in the back piece. The padded back panel is configured to rest against a backpack wearer's back. The shoulder strap system includes a pair of shoulder straps extending from a top portion of the back piece, across the back panel, and to a medial portion of the back panel.

In some embodiments, the back panel includes an internal frame curved away from the molded front panel at a bottom portion of the back piece. As a result, when the personal transport vehicle is placed in the back piece, the personal transport vehicle is directed away from the back panel at the bottom portion of the back piece.

In some embodiments, the securing device is a bar rotatably attached to the first ridge. The bar has a first position along the first ridge and a second position across both the first ridge and the second ridge. In the second position, the bar is hooked over a post under a post head in the second ridge.

In some embodiments, the bar is a flat bar configured to bend over the personal transport vehicle when i) the personal transport vehicle is placed in the back piece between the ridges, and ii) the bar is in the second position and hooked over the post in the second ridge. When the bar is bent over the personal transport vehicle and hooked over the post and under the post head, the bar applies pressure to the personal transport vehicle by way of springback in an elastic zone of the bar.

In some embodiments, the shoulder strap system further includes a chest strap configured to extend from a first shoulder strap to a second shoulder strap of the shoulder strap system when the chest strap is connected.

In some embodiments, the shoulder strap system further includes webbing along both the first shoulder strap and the second shoulder strap. The webbing is configured in part for adjusting a location of the chest strap along the first and shoulder strap and the second shoulder strap from the top portion of the back piece to the medial portion of the back panel.

In some embodiments, the shoulder strap system further includes a haul strap near the top portion of the back piece. The haul strap is formed by a bridge between a first shoulder strap and a second shoulder strap of the shoulder strap system near the top portion of the back piece.

In some embodiments, the molded front panel is fixed to a fabric backing. The fabric backing includes a flap extending past a bottom portion of the molded front panel. The flap includes a strap configured to hold an end portion of the personal transport vehicle when the personal transport vehicle is placed in the back piece. The strap is also configured to secure the flap between the ridges of the molded front panel when the flap is folded over the molded front panel and not in use for the personal transport vehicle.

In some embodiments, the backpack further includes a front piece including a bag of a flexible material having a main storage compartment, a magnetic pocket with a magnetic clasp in a first side of the bag, and a zippered pocket in a second side of the bag. The backpack is configured to sandwich the personal transport vehicle between the front piece and the back piece when the personal transport vehicle is placed in the backpack.

In some embodiments, the backpack has a clamshell-type configuration with a fabric hinge on one side of the backpack and a zipper on an opposing side of the backpack.

Also provided herein is personal transport vehicle system including an electrically powered skateboard and a backpack configured for carrying the skateboard. The backpack includes a back piece and a front piece. The back piece includes a molded front panel, a securing device attached to the molded front panel, a padded back panel opposite the molded front panel, and a shoulder strap system of the backpack. The molded front panel includes at least two ridges configured for placement of at least a portion of a body of the skateboard between the ridges. The securing device is fixedly attached to a first ridge of the ridges. The securing device is configured to cross over the molded front panel to a second ridge of the ridges to secure the body of the skateboard between the ridges when the skateboard is placed in the back piece. The padded back panel is configured to rest against a backpack wearer's back. The shoulder strap system includes a pair of padded shoulder straps extending from a top portion of the back piece, across the back panel, and to a medial portion of the back panel. The front piece includes a bag of a flexible material having a main storage compartment, a magnetic pocket with a magnetic clasp in a first side of the bag, and a zippered pocket in a second side of the bag. The backpack is configured to sandwich the skateboard between the front piece and the back piece when the skateboard is placed in the backpack. The backpack has a clamshell-type configuration with a fabric hinge on one side of the backpack and a zipper on an opposing side of the backpack, the backpack configured to sandwich the skateboard between the front piece and the back piece.

In some embodiments, the personal transport vehicle system further includes a companion remote control configured to control one or more features of the skateboard. The magnetic pocket with the magnetic clasp is configured for one-handed placement of the remote control in the magnetic pocket and one-handed removal of the remote control from the magnetic pocket.

In some embodiments, the back panel includes an internal aluminum frame curved away from the molded front panel at a bottom portion of the back piece. As a result, when the skateboard is placed in the back piece, the skateboard and wheels of the skateboard are directed away from the back panel at the bottom portion of the back piece.

In some embodiments, the securing device is a flat bar rotatably attached to the first ridge. The bar has a first position along the first ridge and a second position across both the first ridge and the second ridge. The bar is configured to bend over the skateboard when i) the skateboard is placed in the back piece between the ridges and ii) the bar is in the second position, hooked over a post in the second ridge, and hooked under a post head. When the bar is bent over the skateboard and hooked over the post and under the post head, the bar applies pressure to the skateboard by way of springback in an elastic zone of the bar.

In some embodiments, the molded front panel is sewn to a fabric backing, and the fabric backing is, in turn, sewn to the padded back panel. The fabric backing includes a flap extending past a bottom portion of the molded front panel. The flap includes a strap configured to hold a tail of the skateboard when the skateboard is placed in the back piece. The strap is also configured to secure the flap between the ridges of the molded front panel by way of a hook-and-loop fastener when the flap is folded over the molded front panel and not in use for the skateboard.

In some embodiments, the skateboard includes a deck, a pair of trucks, two pairs of wheels, and one or more batteries. The deck is configured to support the user's weight while standing on the deck and operating the skateboard. The pair of trucks is mounted to a bottom of the deck, and each truck of the pair of trucks includes an axle. One pair of wheels of the two pairs of wheels is mounted on each axle of the trucks. The one or more batteries power a motor configured to drive the wheels by way of a drive system.

In some embodiments, the deck is formed of a deck core, a sidewall around a perimeter of the deck core, a top laminate over both the deck core and the sidewall, and a bottom laminate under both the deck core and the sidewall. The sidewall is formed of a top sidewall layer, a bottom sidewall layer, and a middle sidewall layer between the top sidewall layer and the bottom sidewall layer. A first groove in the perimeter of the deck is present between the deck core and the middle sidewall layer as well as between the top sidewall layer and the bottom sidewall layer. The first groove is configured for a light strip dispose therein.

Also provided herein is a method of making a backpack for a personal transport vehicle including, in some embodiments, making a back piece of the backpack. Making the back piece of the backpack includes molding a front panel of the back piece, the front panel including at least two ridges configured for placement of at least a portion of a body of the personal transport vehicle between the ridges. Making the back piece of the backpack includes attaching a securing device to a first ridge of the ridges. The securing device is configured to cross over the molded front panel to a second ridge of the ridges to secure the body of the personal transport vehicle between the ridges when the personal transport vehicle is placed in the back piece. Making the back piece of the backpack includes padding a back panel of the back piece, the padded back panel configured to rest against a backpack wearer's back. Making the back piece of the backpack includes installing a shoulder strap system including a pair of shoulder straps extending from a top portion of the back piece, across the back panel, and to a medial portion of the back panel.

In some embodiments, the method of making the backpack further includes fixing the molded front panel to a backing of fabric. The backing includes a flap extending past a bottom portion of the molded front panel. The flap includes a strap configured to hold an end portion of the personal transport vehicle when the personal transport vehicle is placed in the back piece. Making the backpack further includes forming the back panel with a same or different fabric around an internal frame. Making the backpack further includes fixing the back panel to the molded front panel such that the internal frame is curved away from the molded front panel at a bottom portion of the back piece. When the personal transport vehicle is placed in the back piece, the personal transport vehicle is directed away from the back panel at the bottom portion of the back piece.

In some embodiments, the method of making the backpack further includes making a front piece of the backpack. Making the front piece of the backpack includes forming a bag with a main storage compartment from a flexible material; installing a magnetic pocket with a magnetic clasp in a first side of the bag; and installing a zippered pocket in a second side of the bag.

In some embodiments, the method of making the backpack further includes fixing the front piece and the back piece of the backpack together in a clamshell-type configuration with a fabric hinge on one side of the backpack and a zipper on an opposing side of the backpack. The backpack is configured to sandwich the personal transport vehicle between the front piece and the back piece.

These and other features of the design provided herein can be better understood with reference to the drawings, description, and claims, all of which form the disclosure of this patent application.

DRAWINGS

FIG. 1A provides a schematic illustrating a backpack for a personal transport vehicle in accordance with some embodiments.

Figure 1B:
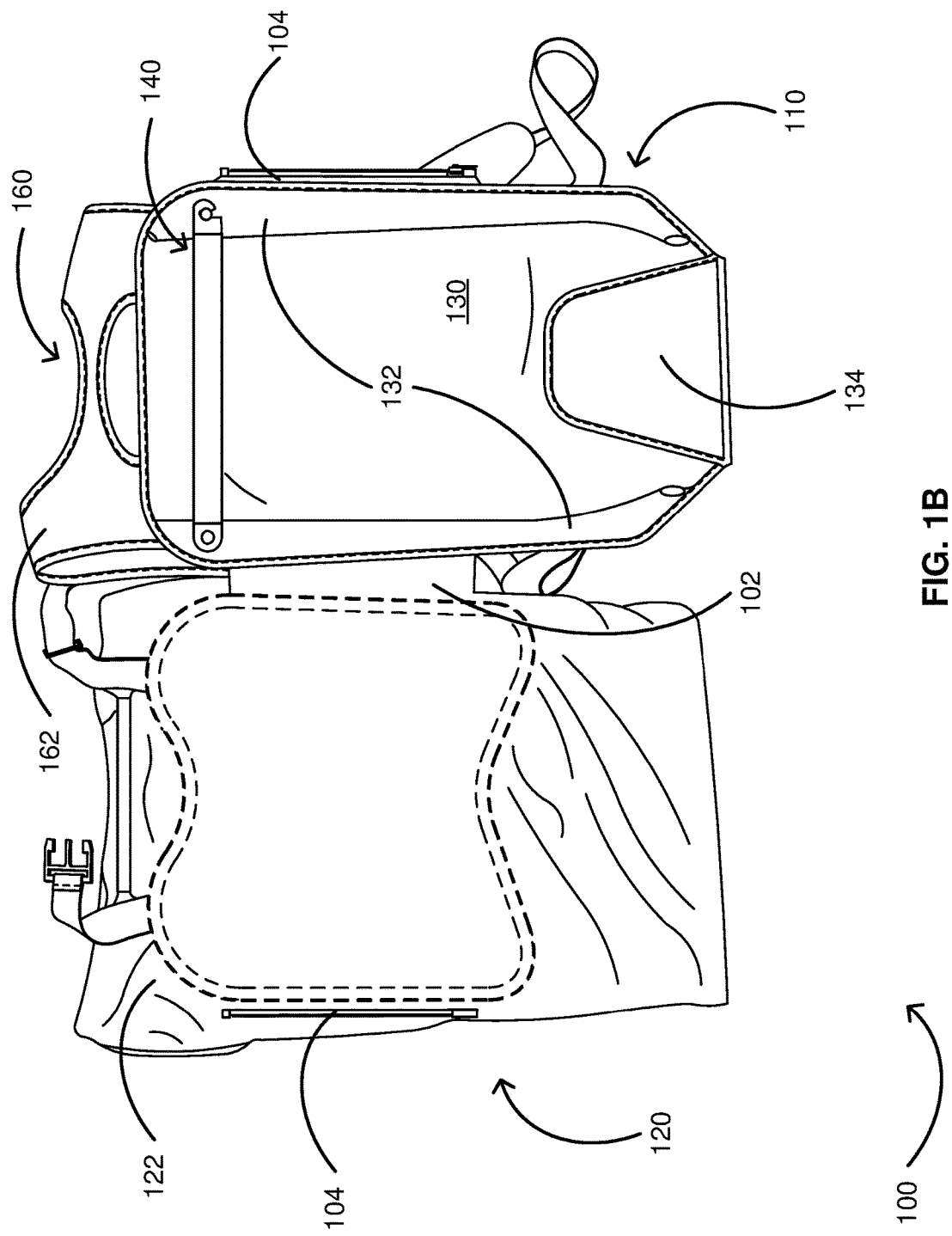

FIG. 1B provides a schematic illustrating a backpack for a personal transport vehicle in accordance with some embodiments.

Figure 2:
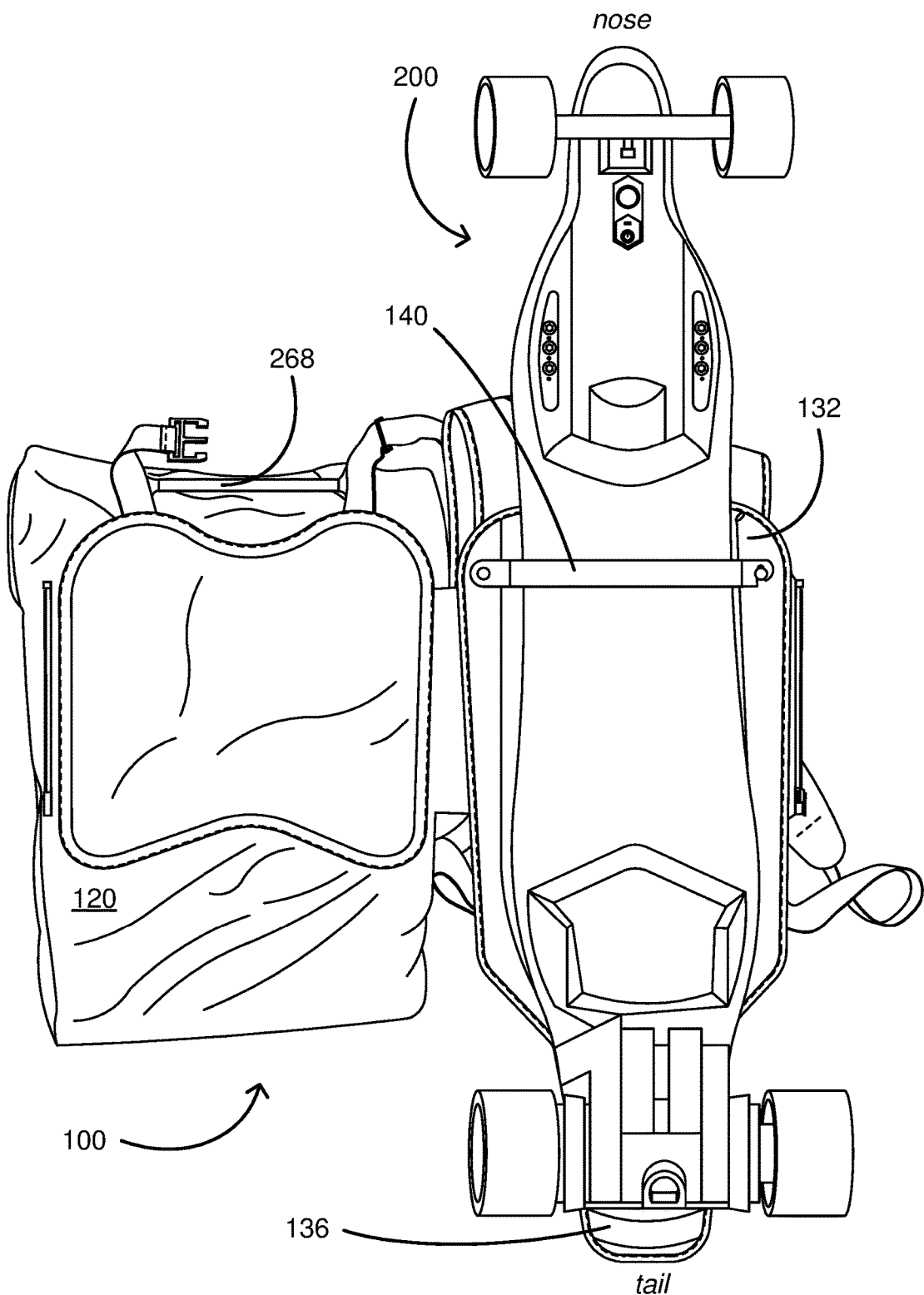

FIG. 2 provides a schematic illustrating an opened backpack including a personal transport vehicle in the backpack in accordance with some embodiments.

FIG. 3A provides a schematic illustrating a top view of a securing device in accordance with some embodiments.

FIG. 3B provides a schematic illustrating a side view of a securing device in accordance with some embodiments.

Figure 4A:
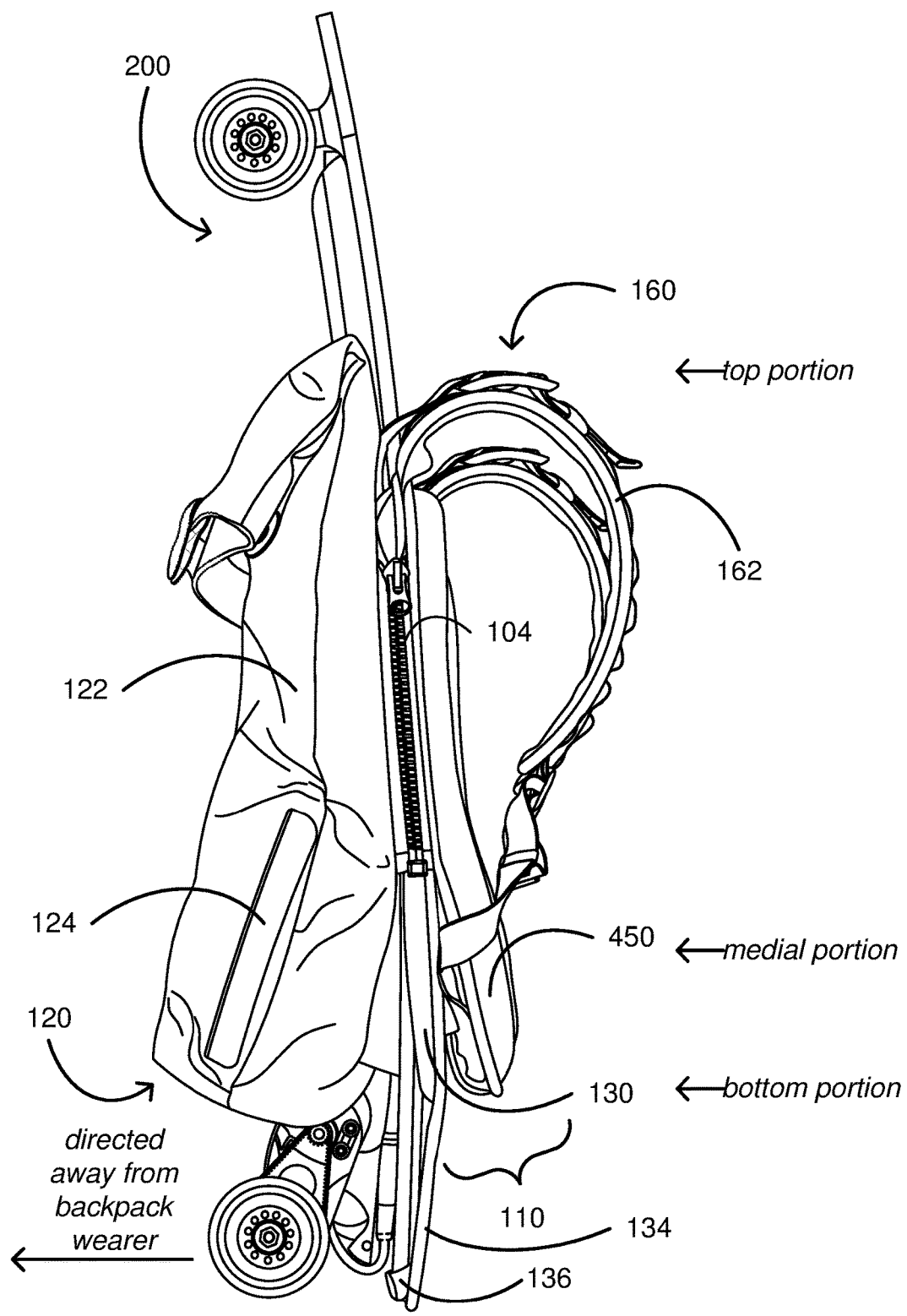

FIG. 4A provides a schematic illustrating a side view of a closed backpack including a personal transport vehicle in the backpack in accordance with some embodiments.

Figure 4B:
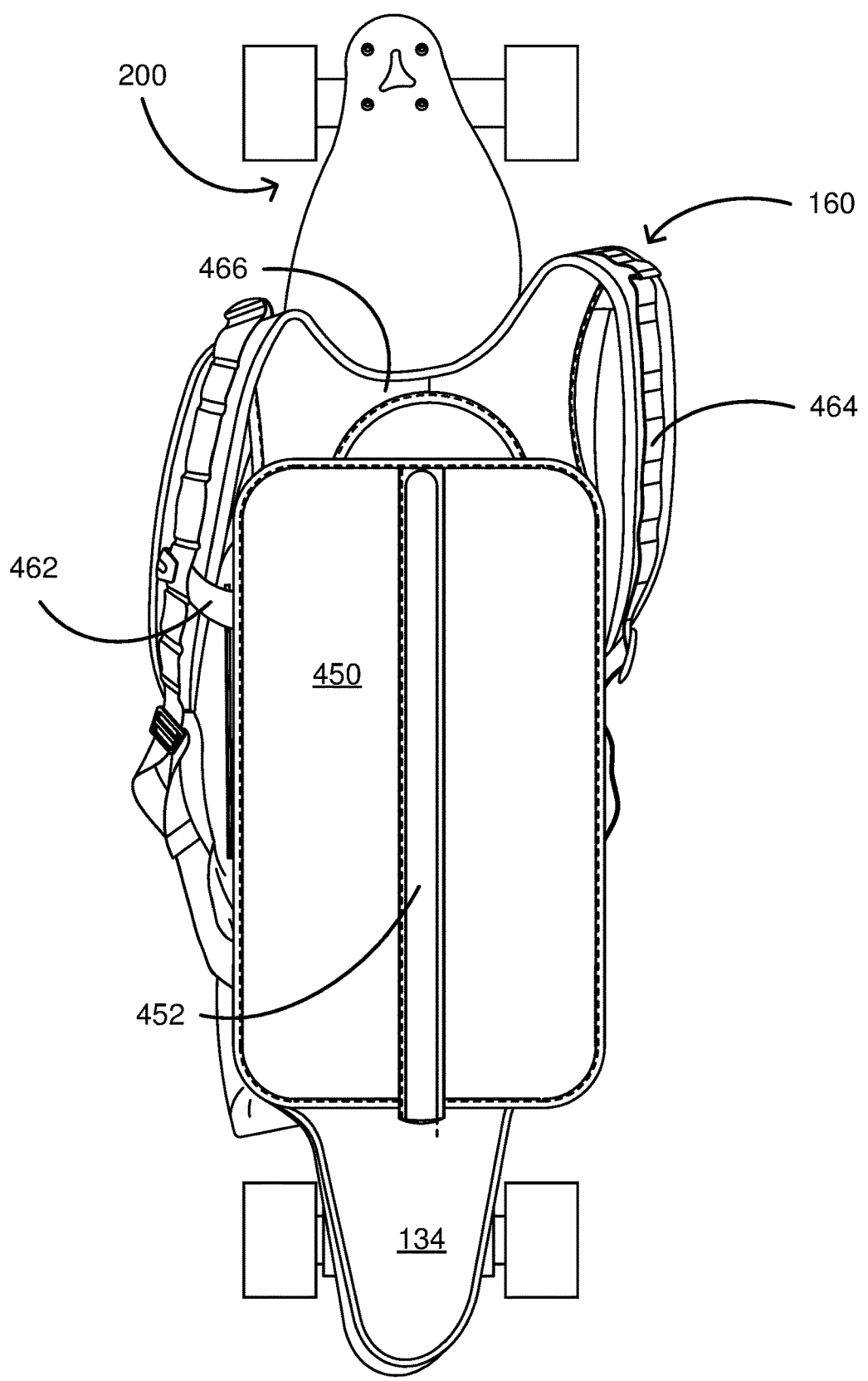

FIG. 4B provides a schematic illustrating a back view of a closed backpack including a personal transport vehicle in the backpack in accordance with some embodiments.

Figure 4C:
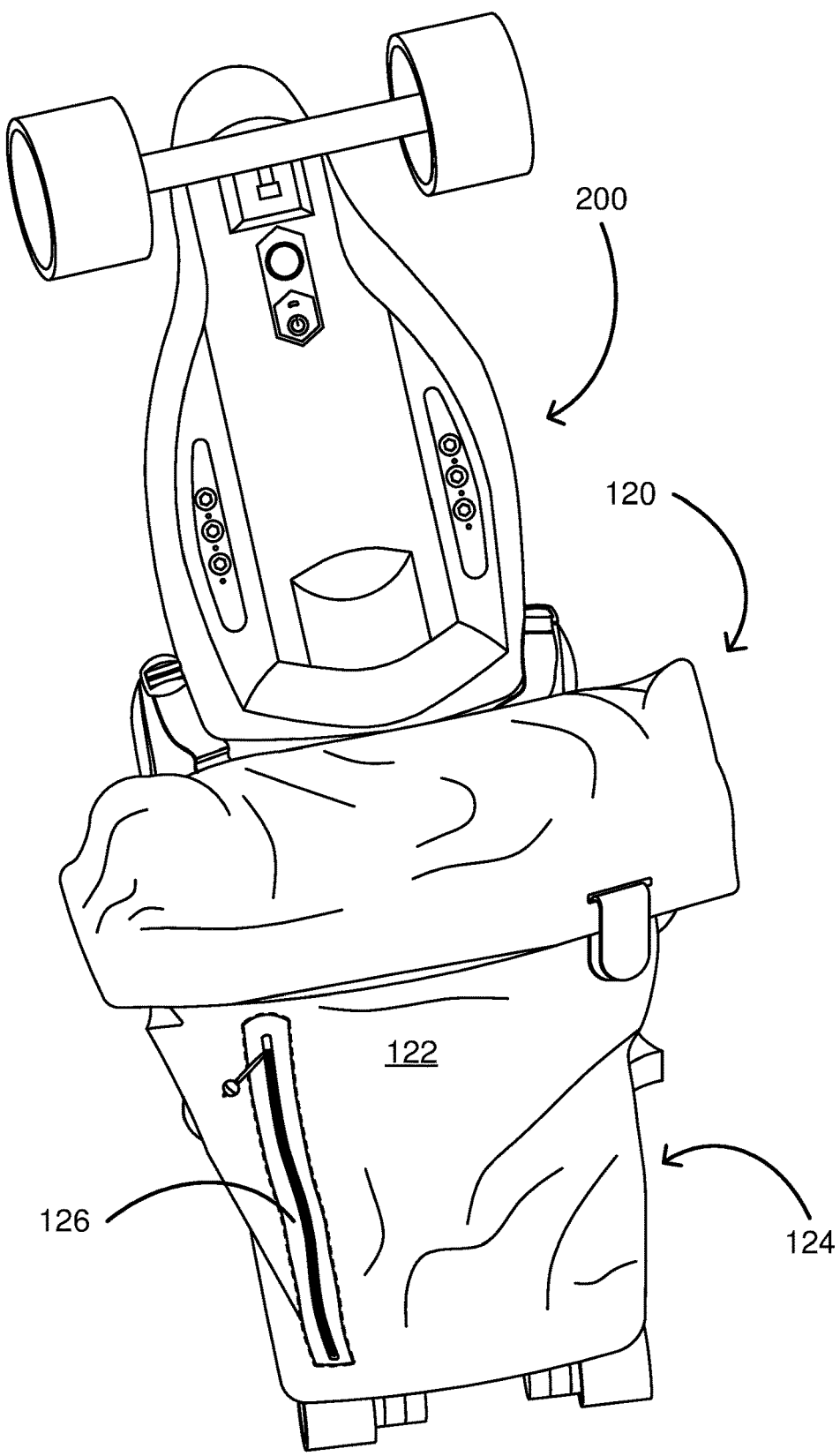

FIG. 4C provides a schematic illustrating a front view of a closed backpack including a personal transport vehicle in the backpack in accordance with some embodiments.

Figure 4D:
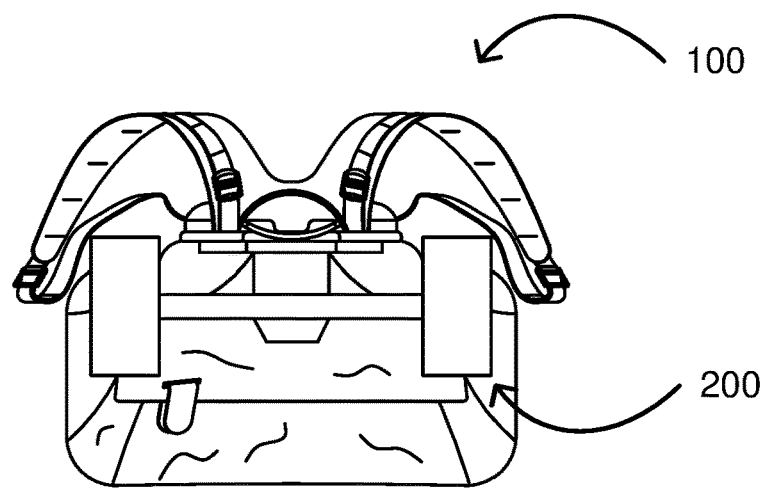

FIG. 4D provides a schematic illustrating a top view of a closed backpack including a personal transport vehicle in the backpack in accordance with some embodiments.

Figure 4E:
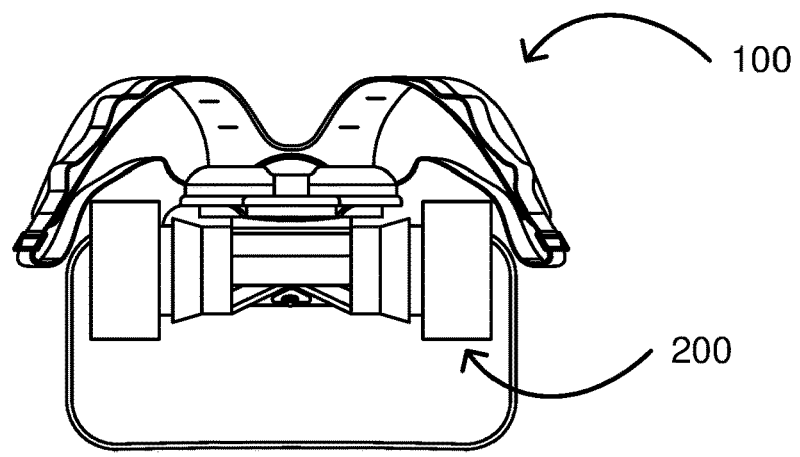

FIG. 4E provides a schematic illustrating a bottom view of a closed backpack including a personal transport vehicle in the backpack in accordance with some embodiments.

Figure 5A:
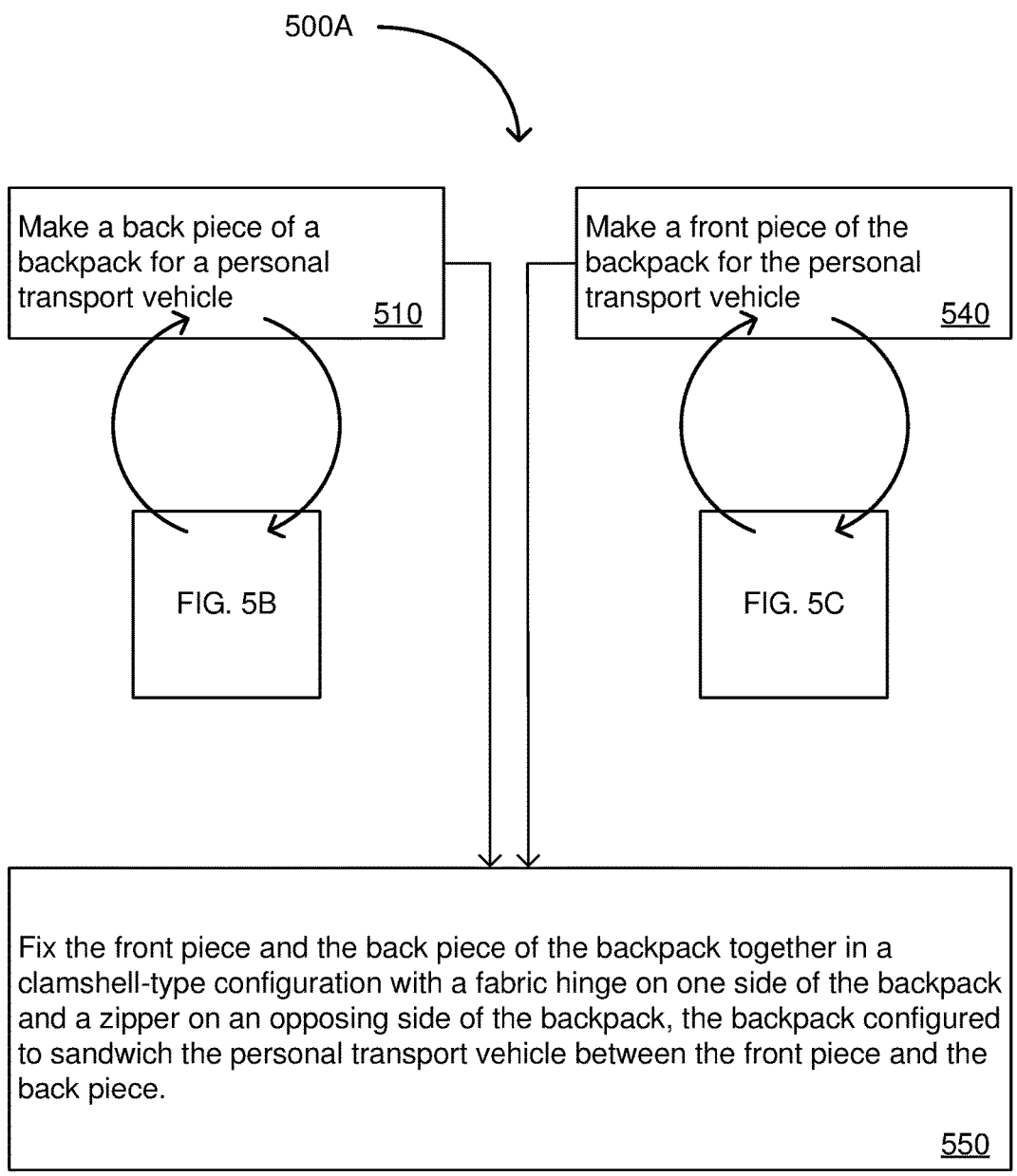

FIG. 5A provides a schematic illustrating a method of making a backpack for a personal transport vehicle in accordance with some embodiments.

Figure 5B:
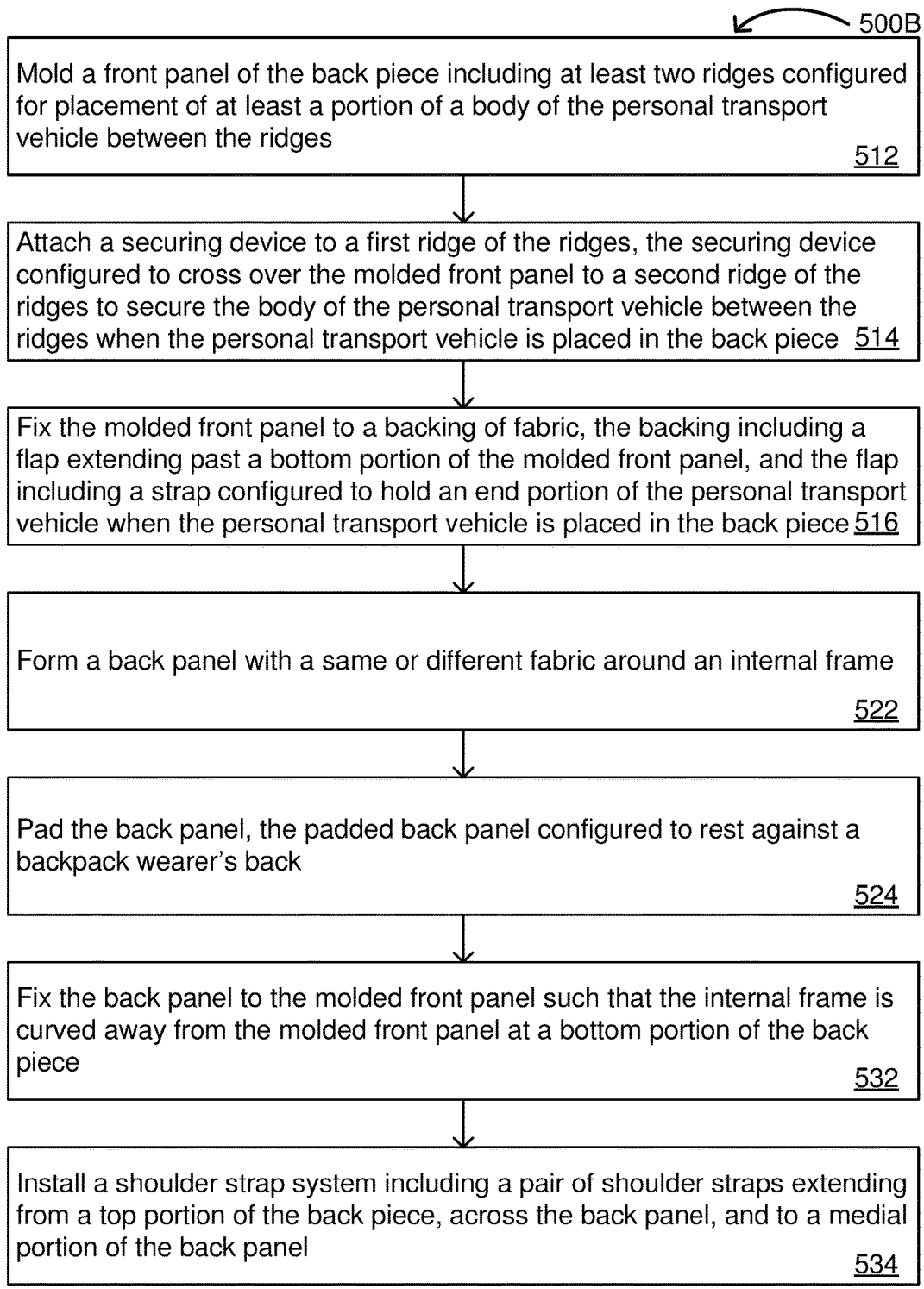

FIG. 5B provides a schematic illustrating a method of making a back piece of a backpack for a personal transport vehicle in accordance with some embodiments.

FIG. 5C provides a schematic illustrating a method of making a front piece of a backpack for a personal transport vehicle in accordance with some embodiments.

Figure 6:
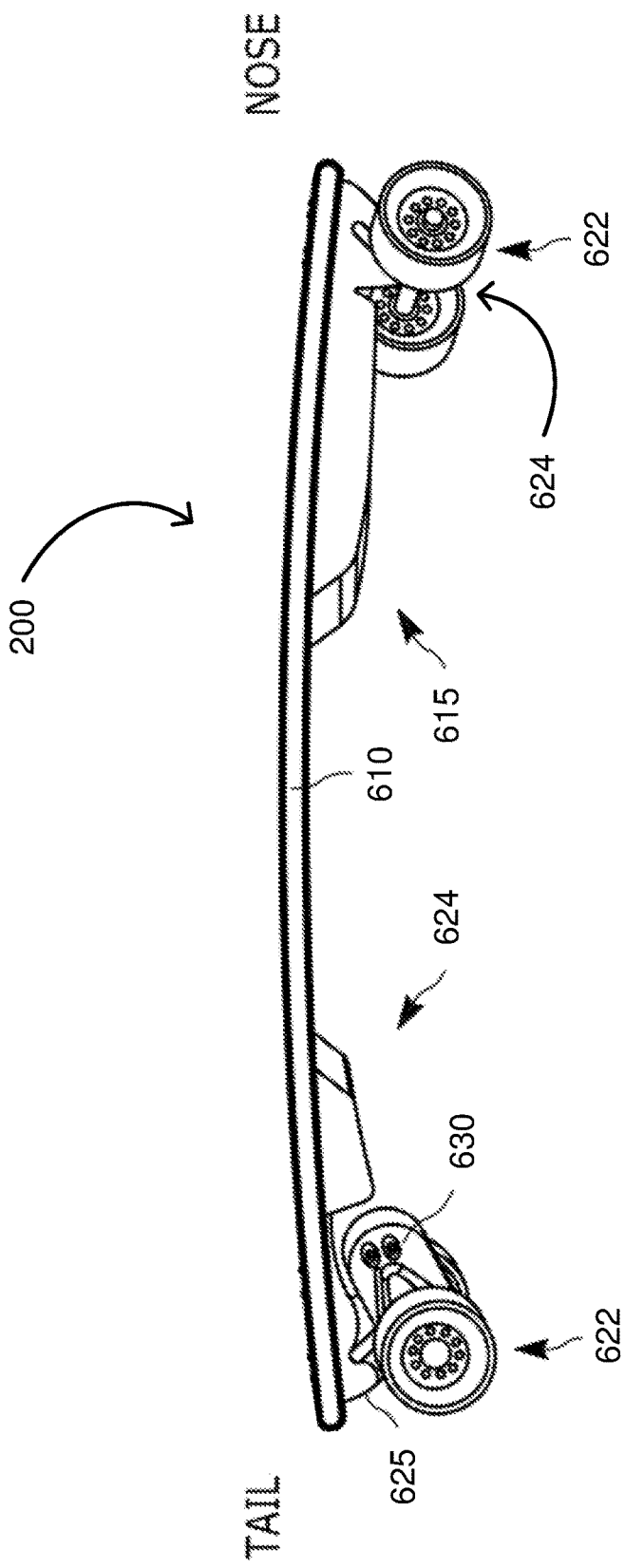

FIG. 6 provides a schematic illustrating an electric-powered skateboard including a deck, one or more wheels, and one or more electric motors mounted to a drive truck of one or more trucks in accordance with some embodiments.

Figure 7:
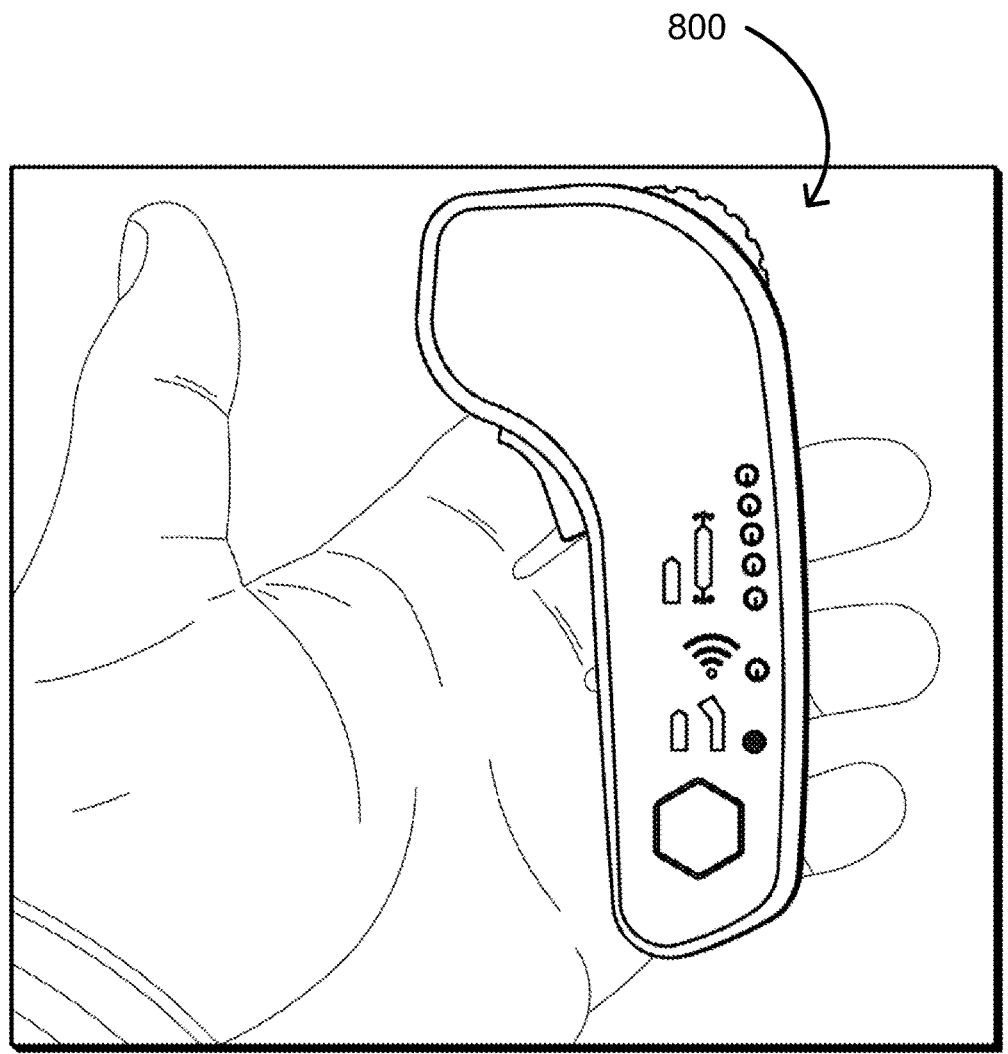

FIG. 7 provides a schematic illustrating a companion remote control for controlling an electric-powered skateboard in accordance with some embodiments.

While the design is subject to various modifications, equivalents, and alternative forms, specific embodiments thereof have been shown by way of example in the drawings and will now be described in detail. The design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, numbers of wheels in a device, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a backpack pocket, can be made. However, the specific numeric reference should not be interpreted as a literal sequential order but rather interpreted that the first backpack is different than a second backpack pocket. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

Provided herein is backpack for a personal transport vehicle including, in some embodiments, a back piece including a molded front panel, a securing device attached to the molded front panel, a padded back panel opposite the molded front panel, and a shoulder strap system of the backpack. The molded front panel includes at least two ridges configured for placement of at least a portion of a body of the personal transport vehicle between the ridges. The securing device is fixedly attached to a first ridge of the ridges. The securing device is configured to cross over the molded front panel to a second ridge of the ridges to secure the body of the personal transport vehicle between the ridges when the personal transport vehicle is placed in the back piece. The padded back panel is configured to rest against a backpack wearer's back. The shoulder strap system includes a pair of shoulder straps extending from a top portion of the back piece, across the back panel, and to a medial portion of the back panel. Such a backpack is useful and convenient for storing a personal transport vehicle such as an electric-powered skateboard before or after the last-mile transportation gap is bridged with the personal transport vehicle.

Backpack

FIGS. 1A, 1B, 2, and 4A-4E collectively provide schematics illustrating a backpack 100 for a personal transport vehicle in accordance with some embodiments. As shown, the backpack 100 includes a back piece 110 and a front piece 120. The backpack 100 is configured to sandwich the personal transport vehicle between the front piece 120 and the back piece 110 when the personal transport vehicle is placed in the backpack 100. The backpack 100 can have a clamshell-type configuration with a fabric hinge 102 on one side of the backpack 100 and a zipper 104 on an opposing side of the backpack 100. The clamshell-type configuration can be used to sandwich the personal transport vehicle between the front piece 120 and the back piece 110.

Front Piece of the Backpack

The front piece 120 of the backpack 100 includes a bag 122 of a flexible material such as a textile, the textile being a natural textile (e.g., cotton duck, cotton twill, etc.), a synthetic textile (e.g., ballistic nylon), or a blend of natural and synthetic textiles (e.g., cotton duck or cotton twill with spandex, etc.).

The bag 122 can include a main storage compartment configured to open at a top portion of the bag 122, which is coextensive with a top portion of the front piece 120 and the backpack 100. While the main storage compartment is not expressly shown in the figures, FIGS. 4A and 4C do show the top portion of the bag 122 folded over, thereby closing the main storage compartment. The bag 122 can include a zipper or draw string in the top portion of the bag 122 for respectively drawing or zipping closed the main storage compartment. Alternatively, or additionally, the top portion of the bag 122 can be folded over onto a medial portion of the bag 122 as shown in FIGS. 4A and 4C and subsequently snapped or magnetically clasped with one or more snap fasteners or magnetic clasps on an outside of the bag 122 to close the main storage compartment.

The bag 122 can further include a magnetic pocket 124 with a magnetic clasp in a first side of the bag 122. The magnetic pocket 124 can be sized for a handheld device such as a companion remote of the personal transport vehicle, a mobile phone, or the like. The magnetic pocket 124 is configured with a magnetic clasp (e.g., matched magnetic strips sewn into an opening of the magnetic pocket 124) such that the handheld device (e.g., companion remote, mobile phone, etc.) can be placed in the magnetic pocket 124 with one hand (i.e., the hand holding the handheld device) as well as removed from the magnetic pocket 124 with one hand. One-handed placement and removal of the handheld device from the magnetic pocket 124 is a useful feature when, for example, operating the personal transport vehicle or holding one or more other items (e.g., the backpack 100 itself) in an opposite hand.

The bag 122 can further include a zippered pocket 126 in a second side of the bag 122. The zippered pocket 126 can have a size between that of the main storage compartment and the magnetic pocket 124.

Back Piece of the Backpack

The back piece 110 includes a front panel 130 and a back panel 450 (see FIG. 4A) opposite the front panel 130.

Front Panel of the Back Piece

The front panel 130 can be molded to form a molded front panel that is structurally characteristic of a molding process such as injection molding. The front panel 130 can include at least two ridges 132 configured for placement of at least a portion of a body of the personal transport vehicle between the ridges 132. The front panel 130, can be molded from, but is not limited to, a polymer such as ethylene-vinyl acetate ("EVA"), which EVA can range in proportion of the vinyl acetate monomer. The more vinyl acetate, the less thermoplastic and the more elastomeric the EVA. A more thermoplastic EVA facilitates molding (e.g., injection molding) the front panel 130. A more elastomeric EVA can obviate an additional elastomeric or rubberized coating that is used to coat the molded front panel 130 in some embodiments.

The front panel 130 can be fixed such as sewn to a fabric backing, which fabric backing can be, in turn, fixed or sewn to the back panel 450. The fabric backing can include a flap 134 extending past a bottom portion of the front panel 130. The flap 134 includes a strap 136 configured to hold an end portion of the personal transport vehicle when the personal transport vehicle is placed in the back piece 110. In embodiments in which the personal transport vehicle is a skateboard such as an electric-powered skateboard 200 of FIG. 2, the end portion can be a nose of the skateboard or a tail of the skateboard as shown in FIGS. 2, 4A, and 4B. The flap 134 extending past a bottom portion of the front panel 130 protects a backpack wearer from the personal transport vehicle itself when using the backpack 100 to haul the personal transport vehicle. For example, the flap 134 can protect the backpack wearer from grip tape rubbing on the backpack wearer when the personal transport vehicle is a skateboard.

The strap 136 is also configured to secure the flap 134 between the ridges 132 of the front panel 130 when the flap 134 is not in use for the personal transport vehicle. As shown in FIG. 1A, the strap 136 can include a first piece of a two-piece faster, and the front panel 130 can include a second piece of the two-piece fastener between the ridges 132 of the front panel 130. Such a two-piece fastener can be any two-piece fastener including, but not limited to, a snap fastener or a hook-and-loop fastener such as a VELCRO® Brand hook-and-loop fastener. For example, the strap 136 can include the hook piece of the hook-and-loop fastener along an outwardly facing side of the strap 136, and the front panel 130 can include a loop piece of the hook-and-loop fastener such as loop piece 138 between the ridges 132 of the front panel 130—or vice versa. When the flap 134 is not in use for the personal transport vehicle, the flap 134 is configured to be folded over and onto the front panel 130 such that the two pieces of the two-piece fastener line up.

Securing Device of the Front Panel

The securing device 140 can include a bar 342 (e.g., round bar, flat bar, etc.) configured for securing the personal transport vehicle in the back piece 110 of the backpack 100 as shown in FIG. 2. Such a bar can be fixedly or removably attached to the molded front panel 130 at least one end of the bar 342.

FIGS. 3A and 3B provide schematics illustrating two different views of a securing device 140 in accordance with some embodiments.

As shown, the securing device 140 can include a flat bar, which bar can be fixedly (e.g., captively) but rotatably attached to the first ridge of the ridges 132 in the molded front panel 130. The bar 342 can have a first position along the first ridge as shown in FIG. 1A. The bar 342 can also have a second position across both the first ridge and a second ridge of the ridges 132 as shown in FIG. 1B. The bar 342 is configured to rotate from the first position to the second position by crossing or rotating over the molded front panel 130 to the second ridge of the ridges 132.

In the second position, the bar 342 can engage with other elements of the securement device 130 such as a post 344 and a post head 346 in the second ridge. When the personal transport vehicle, or at least a portion of the body thereof, is placed between the ridges 132 of the back piece 110, the bar 342 can be rotated into the second position, bent over the personal transport vehicle, and hooked over the post 344 in the second ridge to secure the personal transport vehicle. (See FIG. 2.) While the bar 342 is bent over the personal transport vehicle, hooked over the post 344, and, further, held under the post head 346 as well, the bar 342 applies pressure to the personal transport vehicle by way of springback in an elastic zone of the bar 342. Such pressure snugly holds the personal transport vehicle between the ridges 132 of the back piece 110.

Back Panel of the Back Piece

The back panel 450 is opposite the molded front panel 130 as best shown in FIG. 4A. The back panel 450 includes an internal frame (not shown) made of a strong but light metal such as aluminum or titanium or a thermoplastic polymer such as high-density polyethylene or polypropylene. The internal frame of the back panel 450 is configured to curve away from the molded front panel 130 (see FIG. 4A) at a bottom portion of the back piece 110. As a result, when the personal transport vehicle is placed in the back piece 110, the personal transport vehicle, including any wheels thereof, is directed away from i) the back panel 450 at the bottom portion of the back piece 110 and a backpack wearer's legs.

As shown in FIG. 4B, the back panel 450 can be padded for comfort to the backpack wearer when the backpack 100, or the padded back panel 450 thereof, rests against the backpack wearer's back. In addition, the padded back panel 450 can include one or more channels 452 between pads of the padded back panel 450. The channels are configured to provide a means for air flow and cooling between the padded back panel 450 and the backpack wearer's back.

Shoulder Strap System

The back piece 110 of the backpack 100 includes a shoulder strap system 160 as shown in FIGS. 1A, 1B, 4A, and 4B. The shoulder strap system 160 includes a pair of shoulder straps 162 extending from a top portion of the back piece 110, across the back panel 450, and to a medial portion of the back panel 450 as best shown in FIGS. 4A and 4B. Each shoulder strap of the pair of shoulder straps 162 can be padded for comfort to the backpack wearer when the backpack 100 is worn.

As shown in FIG. 4B, the shoulder strap system 160 can further include one or more chest straps such as chest strap 462 configured to extend from a first shoulder strap to a second shoulder strap of the shoulder strap system 160 when the chest strap 462 is connected, for example, by a two-piece buckle. Each of the shoulder straps and the chest strap 462 include an adjustment mechanism such as a strap adjuster to shorten or lengthen the straps to adjust to a shape of the backpack wearer's body. The strap adjusters can lift a weight of the backpack 100 and the personal transport vehicle higher up on the backpack wearer's body to lessen a burden of carrying the personal transport vehicle on the backpack wearer. Moreover, each shoulder strap of the shoulder straps can include webbing 464. The webbing 464 is configured in part for adjusting a location of the chest strap 462 along the first shoulder strap 136 and the second shoulder strap 136 from the top portion of the back piece 110 to the medial portion of the back panel 450. The webbing 464 can also be used with other connectors such as carabiners to attach various items to the backpack 100 by the webbing 464.

The shoulder strap system 160 can further include a first haul strap 466 near the top portion of the back piece 110 as shown in FIG. 4B. The first haul strap 466 is formed by a bridge between the first shoulder strap and the second shoulder strap of the shoulder strap system 160. As shown in FIG. 2, the shoulder strap system 160 can further include a second haul strap 268 also near the top portion of the back piece 110. The second haul strap 268 is formed by one or more additional straps between the first shoulder strap and the second shoulder strap of the shoulder strap system 160. The second haul strap 268, being formed of the one or more straps, can be threaded through a polymeric handle to more comfortably fit in the backpack wearer's hand when the backpack 100 is being carried. The first haul strap 466 and the second haul strap 268 are configured to be on opposite sides of the personal transport vehicle when the personal transport vehicle is placed in the backpack 100.

The second haul strap 268 is configured to add stability to the load of the personal transport vehicle, thereby securely holding the personal transport vehicle in place when placed in the backpack 100. Without the second haul strap 268, the personal transport vehicle can pull away from the backpack wearer's back at the top portion of the backpack 100. This can make a backpack without the second haul strap 268 uncomfortable, especially when the backpack wearer is trying to quickly walk or run with the personal transport vehicle in the backpack 100. The second haul strap 268 is further configured to allow the backpack wearer to tighten the top portion of the backpack 100 around the personal transport vehicle, which brings the personal transport vehicle towards the backpack wearer, as well as the center of gravity closer to his or her body.

Methods of Making the Backpack

FIGS. 5A-5C provide schematics illustrating one or more aspects of a method of making the backpack 100 for the personal transport vehicle in accordance with some embodiments. FIG. 5A provides a schematic illustrating an overall method 500A of making the backpack 100; FIG. 5B provides a schematic illustrating a method 500B of making the back piece 110 of the backpack 100; and FIG. 5C provides a schematic illustrating a method 500C of making the front piece 120 of the backpack 100 in accordance with some embodiments.

As shown in FIG. 5A, the method 500A of making the backpack 100 for the personal transport vehicle includes a first step 510 of making the back piece 110 of the backpack 100; a second step 540 of making the front piece 120 of the backpack 100; and a third step 550 of fixing the front piece 110 and the back piece 120 of the backpack 100 together. The first step 510 and the second step 540 can be performed in any order with respect to each other. In addition, the first step 510 and the second step 540 can be performed contemporaneously with each other. Fixing the front piece 110 and the back piece 120 of the backpack 100 together includes fixing the foregoing pieces together in a clamshell-type configuration with the fabric hinge 102 sewed into one side of the backpack 100 and the zipper 104 sewed into an opposing side of the backpack 100. Constructed as such, the backpack 100 is configured to sandwich the personal transport vehicle between the back piece 110 and the front piece 120.

As shown in FIG. 5B, the method 500B of making the back piece 110 of the backpack 100 includes a first step 512 of molding the front panel 130 of the back piece 110. The molded front panel 130 includes the two ridges 132 configured for placement of at least a portion of a body of the personal transport vehicle between the ridges 132. The method 500B of making the back piece 110 further includes a second step 514 of attaching the securing device 140, or a portion thereof such as the bar 342, to the first ridge of the ridges 132. The securing device 140 is configured to cross over the molded front panel 130 to the second ridge of the ridges 132 to secure the body of the personal transport vehicle between the ridges 132 when the personal transport vehicle is placed in the back piece 110. The method 500B of making the back piece 110 further includes a third step 516 of fixing the molded front panel 130 to the backing of fabric such as by sewing the molded front panel 130 to the backing of fabric. Again, the backing includes the flap 134 extending past the bottom portion of the molded front panel 130. The flap 134 includes the strap 136 configured to hold an end portion of the personal transport vehicle when the personal transport vehicle is placed in the back piece 110. The method 500B of making the back piece 110 further includes a fourth step 522 of forming the back panel 450 with the same or different fabric around the internal frame. The method 500B of making the back piece 110 further includes a fifth step 524 of padding the back panel 450, the padded back 450 panel configured to rest against a backpack wearer's back. The method 500B of making the back piece 110 further includes a sixth step 532 of fixing (e.g., sewing) the back panel 450 to the molded front panel 130 such that the internal frame is curved away from the molded front panel 130 at a bottom portion of the back piece 110. The method 500B of making the back piece 110 further includes a seventh step 534 of installing the shoulder strap system 160 including the pair of shoulder straps. The shoulder straps extend from the top portion of the back piece 110, across the back panel 450, and to the medial portion of the back panel 450. The first step 512 through the seventh step 530 can be performed in any order with respect to each other, even contemporaneously, excepting when one step clearly needs to be performed before another step such as to provide a workpiece.

As shown in FIG. 5C, the method 500C of making the front piece 120 of the backpack 100 includes a first step 542 of forming the bag 122 of the front piece 120 including the main storage compartment from a flexible material. The method 500C of making the front piece 120 further includes a second step 544 of installing the magnetic pocket 124 with the magnetic clasp in a first side of the bag 122. The method 500C of making the front piece 120 further includes a third step 546 of installing the zippered pocket 126 in a second side of the bag 122. The first step 542 through the third step 546 can be performed in any order with respect to each other, even contemporaneously, excepting when one step clearly needs to be performed before another step such as to provide a workpiece.

Personal Transport Vehicle

The personal transport vehicle can be the electric-powered skateboard 200 of FIG. 2, which has many features. Some example features will be discussed below. In general, an embodiment discussing an electric-powered skateboard will be discussed as an example embodiment.

FIG. 6 illustrates the electric-powered skateboard 200 that includes a deck 610, one or more wheels 622, one or more electric motors 630 mounted to a drive truck 625 of one or more trucks 624, and one or more batteries 615 to power the one or more electric motors 630. For example, a pair of trucks 624 is mounted to a bottom of the deck 610, and each truck of the pair of trucks includes an axle. One pair of wheels of two pairs of wheels 622 is mounted on each axle of the trucks 624. The one or more batteries 615 power the electric motor 630, which is configured to drive the wheels by way of a drive system. The deck 610 is configured to support a rider's weight while standing on the deck 610 and operating an electric-powered skateboard such as the skateboard 200.

A drive truck 625 supports one or more wheels. The electric motor(s) is configured to drive the wheels. The drive truck 625 is mounted to the deck 610 at either a front (or nose) of the deck 610 or a back (or tail) or the deck 610. The drive truck 625 is mounted to the deck at the front and back of the deck in FIG. 6. One or more batteries within one or more enclosures eventually mount to the deck behind the front truck or in front of the rear truck. For example, the battery is mounted to the deck within a battery enclosure behind the front truck in FIG. 6. The batteries may mount to a bottom surface of the deck or within a compartment within the deck. The deck itself may be the battery enclosure, with no need for a secondary battery enclosure. The one or more batteries supply power to the electric motor or motors and other electronic equipment including various sensors.

The rider may change the angles of the deck by shifting his or her weight on the deck. Changing the balance of the rider's weight may be used as a control input for steering, acceleration, braking, or a combination thereof.

Deck Structural Material and Design

The deck 610 can be formed of a deck core 741 optionally molded around a flexible wooden spine, a sidewall 742 around a perimeter of the deck core 741, a top laminate 743 over both the deck core 741 and the sidewall 742, and a bottom laminate 744 under both the deck core 741 and the sidewall 742. The sidewall 742 can be formed of a top sidewall layer 745, a bottom sidewall layer 746, and a middle sidewall layer 747 between the top sidewall layer 745 and the bottom sidewall layer 746.

The deck 610 may have one or more hollow cavities to house electrical components such as a printed circuit board placed in the deck or molded into the deck for wiring different electrical components together or housing various sensors integrated into the skateboard. For example, a first hollow cavity may be designed into the board in an area under one of the one or more trucks with entrance holes aligned from the top or bottom so that the electrical cable between the battery and the motor can be installed and removed with its electrical connectors and fittings still integrated with the cable.

Companion Remote Control

FIG. 7 provides a schematic illustrating a companion remote control 800 for controlling one or more aspects of the electric-powered skateboard 200 in accordance with some embodiments.

The companion remote control 800 may be a stand-alone hand-held device as shown in FIG. 7, a suitably programmed mobile computing device typically running a software application resident on that mobile computing device, or a combination thereof. In an example embodiment, the mobile computing device may be a smart phone, a smart watch, a tablet computer, etc. The mobile computing device may include a wireless transmitter, such as a radio antenna, for wirelessly communicating with the skateboard. The companion remote control may be a wireless companion remote control and use one or more antennae or transmission frequencies to provide signals to the electric-powered skateboard. Communication may be one way, two way, or networked among multiple devices communicating together with each other or the electric-powered skateboard.

The companion remote control puts the power over the board's operation in of the palm of the rider's hand. The companion remote control is configured to control the acceleration and deceleration of the electric-powered skateboard from a fast or slow acceleration to quick or gentle braking. The high performance, optionally Bluetooth-enabled companion remote control acts as a safe, secure link between the rider and the board. The companion remote control may or may not use the Bluetooth protocol for transmission. Any variety of wireless transmission protocols may be acceptable for transmission of signals to and from the electric-powered skateboard.

Motor Control

The electric-powered skateboard starting and stopping power supplied to the motor is optimized. The optimization extends to its battery to support the corresponding spikes of electrical current from the battery during an initial starting and any rapid braking. The improved dynamic range of batteries can be achieved via a battery controller and use of the regenerative braking. A first algorithm may be tuned specifically for, for example, a three-pound main battery to move a 180-pound rider on the board with a smooth acceleration and deceleration. Large peaks in current and voltage may temporarily exceed manufacturer-stated limits of a cell in the battery, but control algorithms designed into the motor and battery control systems may make this a safe and acceptable action. Timing of power spikes, control of battery temperature, and selective routing of electrical energy to other components in the electric-powered skateboard all may be used to improve the overall acceleration and braking experience while allowing the battery to operate safely. A voltage or current mode control and control algorithm may be used to modulate electrical current spikes to get peak performance.

The controller may dynamically control power supplied to the electric motor(s) for the electric-powered skateboard. The controller may determine one or more user parameters via sensors, a user input value from a rider, and a combination of both. The controller may select a first electrical current output value based on the user input value and/or sensors from an input map. The controller may control power provisioned to the electric motor(s) to maintain an output current within a predetermined range of the first current output value. The controller may, by way of one or more sensors, detect a condition indicative of perturbation. The controller may then select a second electrical current output value for the first user input value based on the user parameter(s). The controller may in response to detecting the condition indicative of perturbation, controlling power provision to the electric motor to maintain the output current within a second predetermined range of the second current output value. The controller may then incrementally adjust an electrical current output value mapped to the first user input value from the second current output value to the first current output value. The controller will control power provisioning to the electric motor to maintain the output electrical current within a predetermined range of each adjusted current output value.

A set of electrical current sensors may be installed on the motor or in the motor control circuit.

An example embodiment of an electric-powered skateboard can use a belt drive system. Another embodiment can use a pulley system.

Network

A number of electronic systems and devices can communicate with each other in a network environment. The network environment has a communications network. The network can include one or more networks selected from an optical network, a cellular network, the Internet, a Local Area Network ("LAN"), a Wide Area Network ("WAN"), a satellite network, a fiber network, a cable network, and combinations thereof. In an embodiment, the communications network is the Internet. There may be many server computing systems and many client computing systems connected to each other via the communications network.

The communications network can connect one or more server computing systems selected from at least a first server computing system and a second server computing system to each other and to at least one or more client computing systems as well. The server computing systems can each optionally include organized data structures such as databases. Each of the one or more server computing systems can have one or more virtual server computing systems, and multiple virtual server computing systems can be implemented by design. Each of the one or more server computing systems can have one or more firewalls to protect data integrity.

The at least one or more client computing systems can be selected from a first mobile computing device (e.g., smartphone with an Android-based operating system), a second mobile computing device (e.g., smartphone with an iOS-based operating system), a first wearable electronic device (e.g., a smartwatch), a first portable computer (e.g., laptop computer), a third mobile computing device or second portable computer (e.g., tablet with an Android- or iOS-based operating system), a first electric personal transport vehicle, a second electric personal transport vehicle, and the like. The client computing system can include, for example, the software application or the hardware-based system in which may be able exchange communications with the first electric personal transport vehicle, and/or the second electric personal transport vehicle. Each of the one or more client computing systems can have one or more firewalls to protect data integrity.

It should be appreciated that the use of the terms "client computing system" and "server computing system" is intended to indicate the system that generally initiates a communication and the system that generally responds to the communication. For example, a client computing system can generally initiate a communication and a server computing system generally responds to the communication. No hierarchy is implied unless explicitly stated. Both functions can be in a single communicating system or device, in which case, the client-server and server-client relationship can be viewed as peer-to-peer. Thus, if the first portable computer (e.g., the client computing system) and the server computing system can both initiate and respond to communications, their communications can be viewed as peer-to-peer. Additionally, the server computing systems include circuitry and software enabling communication with each other across the network.

Any one or more of the server computing systems can be a cloud provider. A cloud provider can install and operate application software in a cloud (e.g., the network such as the Internet) and cloud users can access the application software from one or more of the client computing systems. Generally, cloud users that have a cloud-based site in the cloud cannot solely manage a cloud infrastructure or platform where the application software runs. Thus, the server computing systems and organized data structures thereof can be shared resources, where each cloud user is given a certain amount of dedicated use of the shared resources. Each cloud user's cloud-based site can be given a virtual amount of dedicated space and bandwidth in the cloud. Cloud applications can be different from other applications in their scalability, which can be achieved by cloning tasks onto multiple virtual machines at run-time to meet changing work demand. Load balancers distribute the work over the set of virtual machines. This process is transparent to the cloud user, who sees only a single access point.

Cloud-based remote access can be coded to utilize a protocol, such as Hypertext Transfer Protocol ("HTTP"), to engage in a request and response cycle with an application on a client computing system such as a web-browser application resident on the client computing system. The cloud-based remote access can be accessed by a smartphone, a desktop computer, a tablet, or any other client computing systems, anytime and/or anywhere. The cloud-based remote access is coded to engage in 1) the request and response cycle from all web browser based applications, 3) the request and response cycle from a dedicated on-line server, 4) the request and response cycle directly between a native application resident on a client device and the cloud-based remote access to another client computing system, and 5) combinations of these.

Computing Systems

A computing system can be, wholly or partially, part of one or more of the server or client computing devices in accordance with an embodiment. Components of the computing system can include, but are not limited to, a processing unit having one or more processing cores, a system memory, and a system bus that couples various system components including the system memory to the processing unit. The system bus may be any of several types of bus structures selected from a memory bus or memory controller, a peripheral bus, and a local bus using any of a variety of bus architectures.

The computing system typically includes a variety of computing machine-readable media. Computing machine-readable media can be any available media that can be accessed by computing system and includes both volatile and nonvolatile media, and removable and non-removable media. By way of example, and not limitation, computing machine-readable media use includes storage of information, such as computer-readable instructions, data structures, other executable software or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device. Transitory media such as wireless channels are not included in the machine-readable media. Communication media typically embody computer readable instructions, data structures, other executable software, or other transport mechanism and includes any information delivery media.

The system memory includes computer storage media in the form of volatile and/or nonvolatile memory such as read only memory (ROM) and random-access memory (RAM). The drives and their associated computer storage media discussed herein, provide storage of computer readable instructions, data structures, other executable software and other data for the computing system.

A user may enter commands and information into the computing system through input devices such as a keyboard, touchscreen, or software or hardware input buttons, a microphone, a pointing device and/or scrolling input component, such as a mouse, trackball or touch pad. The microphone can cooperate with speech recognition software. These and other input devices are often connected to the processing unit through a user input interface that is coupled to the system bus, but can be connected by other interface and bus structures, such as a parallel port, game port, or a universal serial bus (USB). A display monitor or other type of display screen device is also connected to the system bus via an interface, such as a display interface. In addition to the monitor, computing devices may also include other peripheral output devices such as speakers, a vibrator, lights, and other output devices, which may be connected through an output peripheral interface.

The computing system can operate in a networked environment using logical connections to one or more remote computers/client devices, such as a remote computing system. The logical connections can include a personal area network ("PAN") (e.g., Bluetooth®), a local area network ("LAN") (e.g., Wi-Fi), and a wide area network ("WAN") (e.g., cellular network), but may also include other networks. Such networking environments are commonplace in offices, enterprise-wide computer networks, intranets and the Internet. A browser application may be resident on the computing device and stored in the memory.

Another device that may be coupled to bus is a power supply such as a DC power supply (e.g., battery) or an AC adapter circuit. As discussed above, the DC power supply may be a battery, a fuel cell, or similar DC power source that needs to be recharged on a periodic basis. A wireless communication module can employ a Wireless Application Protocol to establish a wireless communication channel. The wireless communication module can implement a wireless networking standard.

In an embodiment, software used to facilitate algorithms discussed herein can be embodied onto a non-transitory machine-readable medium. A machine-readable medium includes any mechanism that stores information in a form readable by a machine (e.g., a computer). For example, a non-transitory machine-readable medium can include read only memory (ROM); random access memory (RAM); magnetic disk storage media; optical storage media; flash memory devices; Digital Versatile Disc (DVD's), EPROMs, EEPROMs, FLASH memory, magnetic or optical cards, or any type of media suitable for storing electronic instructions.

Note, an application described herein includes but is not limited to software applications, mobile apps, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as C, C+, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both.

It should be borne in mind, however, that these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

Many functions performed by electronic hardware components can be duplicated by software emulation. Thus, a software program written to accomplish those same functions can emulate the functionality of the hardware components in input-output circuitry.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. A backpack configured to carry a personal transport vehicle, comprising:
 a back piece including
  a molded front panel including at least two ridges, the molded front panel configured for placement of at least a portion of a body of the personal transport vehicle between the ridges;
  a securing device fixedly attached to a first ridge of the ridges; and
  a shoulder strap system including two or more shoulder straps extending from a top portion of the back piece, across a back panel, and to a medial portion of the back panel, wherein the back panel includes an internal frame curved away from the molded front panel at a bottom portion of the back piece such that when the personal transport vehicle is placed in the back piece, the personal transport vehicle is directed away from the back panel at the bottom portion of the back piece.

2. The backpack of claim 1, further comprising:
where the securing device is configured to cross over the molded front panel to a second ridge of the ridges to secure the body of the personal transport vehicle between the ridges when the personal transport vehicle is placed in the back piece;
wherein the securing device is a bar rotatably attached to the first ridge, the bar having a first position along the first ridge and a second position across both the first ridge and the second ridge, and
wherein the bar is hooked over a post under a post head in the second ridge in the second position.

3. The backpack of claim 2,
wherein the bar is a flat bar configured to bend over the personal transport vehicle when the personal transport vehicle is placed in the back piece between the ridges and the bar is hooked over the post in the second ridge in the second position, and
wherein the bar in the second position is configured to apply pressure to the personal transport vehicle by way of springback in an elastic zone of the bar when the personal transport vehicle is placed in the back piece between the ridges and under the bar; and
a padded back panel configured to rest against a backpack wearer's back.

4. The backpack of claim 1,
wherein the shoulder strap system further includes a chest strap configured to extend from a first shoulder strap to a second shoulder strap of the shoulder strap system when the chest strap is connected.

5. The backpack of claim 4,
wherein the shoulder strap system further includes webbing along both the first shoulder strap and the second shoulder strap, and
wherein the webbing is configured in part for adjusting a location of the chest strap along the first and shoulder strap and the second shoulder strap from the top portion of the back piece to the medial portion of the back panel.

6. The backpack of claim 1,
wherein the shoulder strap system further includes a haul strap near the top portion of the back piece, the haul strap formed by a bridge between a first shoulder strap and a second shoulder strap of the shoulder strap system near the top portion of the back piece.

7. The backpack of claim 1,
wherein the molded front panel is fixed to a fabric backing, and
wherein the fabric backing includes a flap extending past a bottom portion of the molded front panel, the flap including a strap configured to i) hold an end portion of the personal transport vehicle when the personal transport vehicle is placed in the back piece and ii) secure the flap between the ridges when folded over the molded front panel and not in use for the personal transport vehicle.

8. The backpack of claim 1, further comprising:
a front piece including
a bag of a flexible material, the bag including a main storage compartment;
a magnetic pocket in a first side of the bag, the magnetic pocket configured with a magnetic clasp; and
a zippered pocket in a second side of the bag,
wherein the backpack is configured to sandwich the personal transport vehicle between the front piece and the back piece when the personal transport vehicle is placed in the backpack.

9. The backpack of claim 8,
wherein the backpack has a clamshell-type configuration with a hinge on one side of the backpack and a zipper on an opposing side of the backpack.

10. A personal transport vehicle system, comprising:
an electrically powered skateboard; and
a backpack configured for carrying the skateboard, the backpack including
a back piece having
a molded front panel including at least two ridges, the molded front panel configured for placement of at least a portion of a body of the skateboard between the ridges;
a securing device fixedly attached to a first ridge of the ridges;
a shoulder strap system including two or more padded shoulder straps extending from a top portion of the back piece, across a back panel, and to a medial portion of the back panel; and
a front piece having
a bag of a flexible material, the bag including a main storage compartment, and
a padded back panel configured to rest against a user's back,
wherein the molded front panel is sewn to a fabric backing and the fabric backing is, in turn, sewn to the padded back panel, and
wherein the fabric backing includes a flap extending past a bottom portion of the molded front panel, the flap including a strap configured to i) hold a tail of the skateboard when the skateboard is placed in the back piece and ii) secure the flap between the ridges by way of a hook-and-loop fastener when the flap is folded over the molded front panel and not in use for the skateboard.

11. The personal transport vehicle system of claim 10, further comprising:
the front piece further having
a magnetic pocket in a first side of the bag, the magnetic pocket configured with a magnetic clasp; and
a zippered pocket in a second side of the bag,
wherein the backpack has a clamshell-type configuration with a fabric hinge on one side of the backpack and a zipper on an opposing side of the backpack, the backpack configured to sandwich the skateboard between the front piece and the back piece;
a companion remote control for the skateboard configured to control one or more features of the skateboard,
wherein the magnetic pocket with the magnetic clasp is configured for one-handed placement of the remote control in the magnetic pocket and one-handed removal of the remote control from the magnetic pocket.

12. The personal transport vehicle system of claim 10,
wherein the back panel includes an internal aluminum frame curved away from the molded front panel at a bottom portion of the back piece such that the skateboard and wheels of the skateboard are directed away from the back panel at the bottom portion of the back piece when the skateboard is placed in the back piece.

13. The personal transport vehicle system of claim 10,
wherein the securing device is configured to cross over the molded front panel to a second ridge of the ridges to secure the body of the skateboard between the ridges when the skateboard is placed in the back piece, wherein the securing device is a flat bar rotatably attached to the first ridge, the bar having a first position along the first ridge and a second position across both the first ridge and the second ridge, wherein the bar is configured to bend over the skateboard when the skateboard is placed in the back piece between the ridges and the bar is in the second position hooked over a post in the second ridge and under a post head, and wherein the bar in the second position is configured to apply pressure to the skateboard by way of springback in an elastic zone of the bar when the skateboard is placed in the back piece between the ridges and under the bar.

14. The personal transport vehicle system of claim 10, the skateboard including
a deck configured to support the user's weight while standing on the deck and operating the skateboard;
a pair of trucks mounted to a bottom of the deck, each truck of the pair of trucks including an axle;
a pair of wheels mounted on each axle of the trucks; and
one or more batteries to power a motor configured to drive the wheels by way of a drive system.

15. The personal transport vehicle system of claim 14,
wherein the deck is formed of a deck core, a sidewall around a perimeter of the deck core, a top laminate over both the deck core and the sidewall, and a bottom laminate under both the deck core and the sidewall, and
wherein the sidewall is formed of a top sidewall layer, a bottom sidewall layer, and a middle sidewall layer between the top sidewall layer and the bottom sidewall layer.

16. A method of making a backpack for a personal transport vehicle, comprising:
making a back piece of the backpack including
molding a front panel including at least two ridges, the molded front panel configured for placement of at least a portion of a body of the personal transport vehicle between the ridges;
attaching a securing device to a first ridge of the ridges, the securing device configured to cross over the molded front panel to a second ridge of the ridges to secure the body of the personal transport vehicle between the ridges when the personal transport vehicle is placed in the back piece; and
installing a shoulder strap system including two or more shoulder straps extending from a top portion of the back piece, across a back panel, and to a medial portion of the back panel,
fixing the molded front panel to a backing of fabric, the backing including a flap extending past a bottom portion of the molded front panel, and the flap including a strap configured to hold an end portion of the personal transport vehicle when the personal transport vehicle is placed in the back piece;
forming the back panel with a same or different fabric around an internal frame; and
fixing the back panel to the molded front panel such that the internal frame is curved away from the molded front panel at a bottom portion of the back piece such that when the personal transport vehicle is placed in the back piece, the personal transport vehicle is directed away from the back panel at the bottom portion of the back piece.

17. The method of claim 16, further comprising:
making a front piece of the backpack including
forming a bag from a flexible material, the bag including a main storage compartment;
installing a magnetic pocket in a first side of the bag, the magnetic pocket configured with a magnetic clasp;
installing a zippered pocket in a second side of the bag; and
fixing the front piece and the back piece of the backpack together in a clamshell-type configuration with a fabric hinge on one side of the backpack and a zipper on an opposing side of the backpack, the backpack configured to sandwich the personal transport vehicle between the front piece and the back piece; and
padding the back panel, the padded back panel configured to rest against a backpack wearer's back.

* * * * *